United States Patent
Vaahtera et al.

(10) Patent No.: US 11,332,624 B2
(45) Date of Patent: May 17, 2022

(54) COMPOSITION FOR COATING FRICTION SURFACES

(71) Applicant: OY RVS TECHNOLOGY LTD., Helsinki (FI)

(72) Inventors: Jouni Vaahtera, Helsinki (FI); Raimo A. Grönroos, Helsinki (FI)

(73) Assignee: OY RVS TECHNOLOGY LTD., Helsinki (FI)

( * ) Notice: Subject to any disclaimer, the term of this patent is extended or adjusted under 35 U.S.C. 154(b) by 21 days.

(21) Appl. No.: 16/095,392

(22) PCT Filed: Apr. 12, 2017

(86) PCT No.: PCT/FI2017/050268
§ 371 (c)(1),
(2) Date: Oct. 22, 2018

(87) PCT Pub. No.: WO2017/182700
PCT Pub. Date: Oct. 26, 2017

(65) Prior Publication Data
US 2019/0127589 A1    May 2, 2019

(30) Foreign Application Priority Data
Apr. 22, 2016  (FI) .................................... 20165353

(51) Int. Cl.
| C09D 1/00 | (2006.01) |
| C09D 7/40 | (2018.01) |
| C08K 3/22 | (2006.01) |
| C08K 3/34 | (2006.01) |

(52) U.S. Cl.
CPC .............. *C09D 1/00* (2013.01); *C08K 3/22* (2013.01); *C09D 7/40* (2018.01); *C08K 3/34* (2013.01); *C08K 2003/222* (2013.01); *C08K 2003/2206* (2013.01); *C08K 2003/2227* (2013.01); *C08K 2003/2241* (2013.01); *C08K 2003/2272* (2013.01)

(58) Field of Classification Search
CPC .............. C09D 1/00; C09D 7/40; C08K 3/22
See application file for complete search history.

(56) References Cited

U.S. PATENT DOCUMENTS

| 2,795,568 | A | * | 6/1957 | Ruehrwein | C04B 33/1305 525/61 |
| 4,919,829 | A | * | 4/1990 | Gates | C10M 103/06 508/172 |
| 6,423,669 | B1 | * | 7/2002 | Alexandrov | C10M 103/06 508/140 |
| 6,726,987 | B2 | * | 4/2004 | Kathrein | C23C 16/30 428/216 |
| 7,304,020 | B1 | | 12/2007 | Tanako | |
| 7,977,265 | B2 | * | 7/2011 | Kesners | C04B 35/20 501/112 |
| 2010/0184585 | A1 | | 7/2010 | Kesners | |
| 2011/0147682 | A1 | * | 6/2011 | Bown | C09K 21/02 252/601 |
| 2012/0009432 | A1 | * | 1/2012 | Cox | C23C 4/08 428/552 |

FOREIGN PATENT DOCUMENTS

| CN | 102924888 A | 2/2013 |
| CN | 102924889 A | 2/2013 |
| CN | 103059807 A | 4/2013 |
| CN | 103756534 A | 4/2014 |
| JP | 2000328171 A | * 11/2000 |
| RU | 2006707 C1 | 1/1994 |
| WO | 2009041795 A1 | 4/2009 |
| WO | 2013185849 A1 | 12/2013 |
| WO | 2015149029 A1 | 10/2015 |

OTHER PUBLICATIONS

Finnish Patent and Registration Office, Search report of Finnish Application No. 20165353, dated Nov. 22, 2016, 1 page.

* cited by examiner

*Primary Examiner* — Colin W. Slifka
*Assistant Examiner* — Michael Forrest
(74) *Attorney, Agent, or Firm* — Thomas | Horstemeyer LLP

(57) ABSTRACT

The present invention relates to a general field of machine building and provides a composition for coating friction surfaces usable for coating friction surfaces to de-crease wear and to reduce the friction coefficient. Also uses of the composition are within the scope of the present invention.

7 Claims, 2 Drawing Sheets

COMPOSITION FOR COATING FRICTION SURFACES

PRIORITY

This application is a U.S national application of the international application number PCT/FI2017/050268 filed on Apr. 12, 2017 and claiming priority of Finnish application No. 20165353 filed on Apr. 22, 2016 the contents of all of which are incorporated herein by reference.

FIELD OF INVENTION

The invention relates to general field of machine building, especially to a composition for coating friction surfaces, a preparation comprising said composition for coating friction surfaces and uses of said composition or preparation.

The composition here described and claimed can be applied for the coating of friction surfaces by a ceramics structure to improve the quality of surfaces and increase the working life of mechanisms.

Instead of the term "composition", the invention can also be called a "charge" i.e. a package of silicate materials used for creating a ceramic structure.

DESCRIPTION OF RELATED ART

WO0102520 relates to the lubricant grease compositions, in particular to the compositions for the treatment of friction pairs, and can be used in the machine building for the treatment of friction units, and also during the exploitation of different mechanisms and machines for prolongation of interrepair time or for damage control (repair-restore operations). The composition disclosed is characterized by containing oxides from the series of MgO, $SiO_2$, $Al_2O_3$ CaO, $Fe_2O_3$, $K_2O$, $Na_2O$. Dehydrated parts of the composition make it useful for coating only hard surfaces, the hardness of which exceeds HRC 45-50. Hydrates in the raw material named above have the hardness of 2-3 on Mohs scale, while for dehydrated parts the corresponding figure is 5.5-7.

WO03074762 relates to mechanical engineering and can be used for friction units. The aim of the invention is to improve the strength characteristics of the elastic deformation resistance of contacting surfaces. The hardening substance is precrushed to the size of 0.01 μm, between rubbing surfaces and applied as mixture of mineral oil contains the following components: Baumite $(Mg, Mn, Fe, Zn)_3(Si, Al)_2 O_5 (OH)_4$ 10-60 mass %; Clinochlor $(Mg_5 Al)(Si, AL)_4 O_{10} (OH)_8$ 10-60 mass %; Titanite $(CaTiSiO_5)$ 1-15 mass %; Silicium dioxid $SiO_2$ 5-10 mass %; Water $H_2O$ equal to or less than 5 mass %. With such differences in the composition, guaranteed quality of the coating cannot be achieved.

RU2246531 discloses a composition useful as natural material-based additive to lubricating oil containing (mass %): serpentine 87-93; chlorite 3-5; magnetite 2-3; dolomite 0.5-1; amphibole 1.5-2; amachinite 1-2. The composition can be used for coating hard steel surfaces only.

U.S. Pat. No. 7,977,265 relates to a general field of machine building and discloses a coating of friction surfaces by ceramics to decrease wear and to reduce the friction coefficient. The composition for coating friction surfaces contains oxides of magnesium, silica, alumine, calcium and ferric, being in the chemical composition of serpentine and talc. The composition disclosed has the following composition of oxides, in mass %: $SiO_2$ 46-54%; MgO 26-32%; $Al_2O_3$ 2-5%; $Fe_2O_3$ 1.0-1.5%; CaO 0.1-0.3%, water $H_2O$ 5% or less.

Drawbacks of the prior art technologies are e.g. when mixing the composition with carrier material such as oil or other viscous liquid, the composition distribution in its volume is nonuniform. This may lead to nonuniform coating with areas of different density, which, in turn, may negatively affect the quality of the coating.

There is a need for providing compositions providing even more uniform and stable coating for various types of metal alloy surfaces.

OBJECTS AND SUMMARY OF THE INVENTION

The aim of the present invention is to improve the coating uniformity and, as a result, enlarge the possible applications of the composition for coating friction surfaces. The aim of the invention is achieved when gibbsite or montmorillonite minerals or a mixture thereof are introduced to the ceramic mixture of constituents containing oxides (MgO, $SiO_2$, $Al_2O_3$, CaO, $Fe_2O_3$) that are naturally present in the serpentine, talc, and clinochlore minerals that the mixture is made of. This leads to the following oxide contents of the composition:

$SiO_2$: 46-54%,
MgO: 22-26%,
$Al_2O_3$: 12-15%,
$Fe_2O_3$: 1.0-1.5%,
CaO: 0.0-0.3%,
$TiO_2$: 0.0-0.21
$H_2O$: ≤5%.

The first aspect of the invention is a composition for coating friction surfaces. According to the invention said composition comprises a mixture of oxides comprising

| | |
|---|---|
| $SiO_2$ | 46-54 wt-% and |
| MgO | 22-26 wt-% and |
| $Al_2O_3$ | 12-15 wt-% and |
| $Fe_2O_3$ | 1.0-1.5 wt-% and |
| CaO | 0.0-0.3 wt-% and |
| $TiO_2$ | 0.0-0.21 wt-% and |
| $H_2O$ | ≤5% | wherein the percentages are based on the total weight of oxides; and

| | |
|---|---|
| $Al(OH)_3$ | 3-8 wt-%, | wherein the percentage of $Al(OH)_3$ is based on the total weight of the composition.

The second aspect of the invention is a preparation comprising a composition described here and conventional carriers.

The third aspect of the invention is a process for preparing the composition for coating friction surfaces. According to the present invention said method comprises the steps of
(a) providing a mixture of oxides comprising

| | |
|---|---|
| $SiO_2$ | 46-54 wt-% and |
| MgO | 22-26 wt-% and |
| $Al_2O_3$ | 12-15 wt-% and |
| $Fe_2O_3$ | 1.0-1.5 wt-% and |
| CaO | 0.0-0.3 wt-% and |
| $TiO_2$ | 0.0-0.21 wt-% and |
| $H_2O$ | ≤5% | wherein the percentages are based on the total weight of oxides; and (b) adding Al(OH)$_3$ to said mixture to obtain a composition wherein the percentage of Al(OH)$_3$ based on the total weight of the composition is 3-8 wt-% of; and (c) mixing said mixture of oxides with said Al(OH)$_3$.

The composition and the preparation of the present invention can be used to form a wear-resistant homogeneous ceramic layer with an extremely low friction coefficient on the friction surfaces of machine parts made of different metal alloys.

DETAILED DESCRIPTION OF THE INVENTION

Machine parts are coated when two surfaces are pressed towards one another and the composition for coating friction surfaces described here is present between them, and there is mechanical activation, either rolling friction or sliding friction energy available between the surfaces.

The particles of the composition for coating friction surfaces, while pressed between the surfaces, are plastically deformed and/or destroyed. Also a mechanical activation of the composition takes place. During this process heat build-up takes place. If the hydrate is heat unprocessed and contains bound water, it has a lower degree of hardness and it is much more pliable in comparison with the dehydrated one. In the course of thermal process, water is exuded causing fall in the temperature of a particle; nevertheless the sintering temperature is reached.

The particles become pliable and the bonds in the crystal lattice are disengaged in the area of the exuded bound water. Reciprocal sintering of particles provides formation of ceramic layer. It is relatively soft and easy to deform. While increasing the pressure between the particles, the respective layer gets consolidated and provides formation of compact olivine/cordierite layer. Fayalite is being formed at the contact area with the surface containing iron and the reason of this is the interchange of Fe⇔Mg between the ceramics and the base layer. Further on a layer of olivine/cordierite is built up. In theory, the latter can be formed without any limits. In practice, the amount of the introduced composition and the size of parts limit it.

Figure 1:
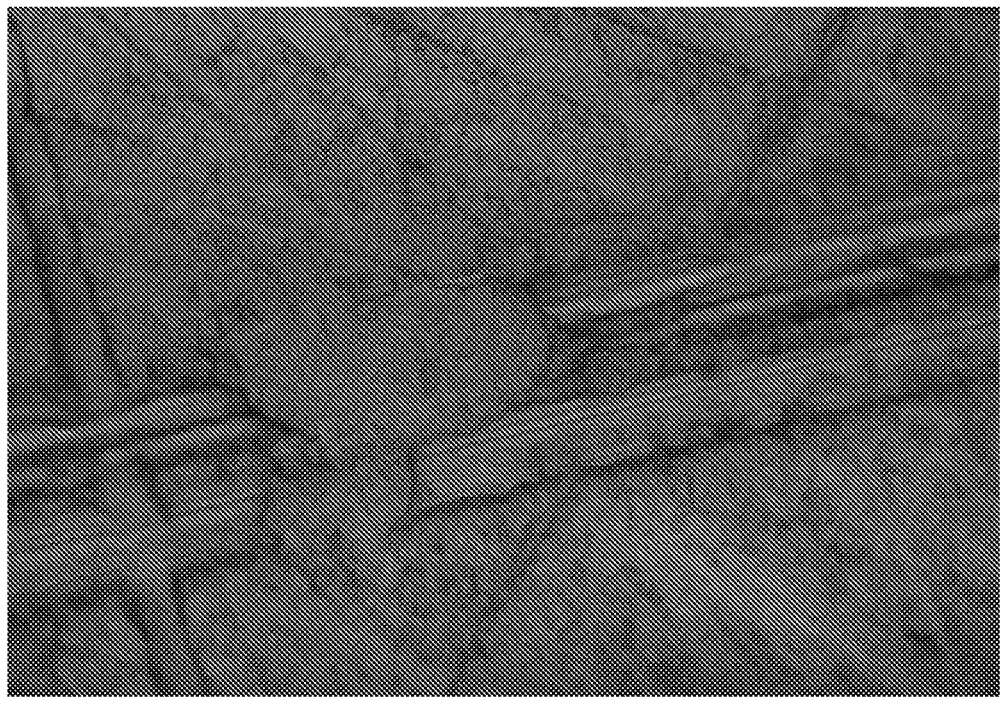
FIG. 1 shows a surface with nonuniform coating

FIG. 1 represents a microscopic photograph magnified by 1600×. The photograph has been taken during a ceramic coating process with a composition that does not contain montmorillonite or TiO$_2$. It is visible that, in the centre part of the picture, there is a zone with a higher degree of density than in other areas of the coating. The high degree density zone has been formed as a result of nonuniform distribution of the composition in the transporting material.

Figure 2:
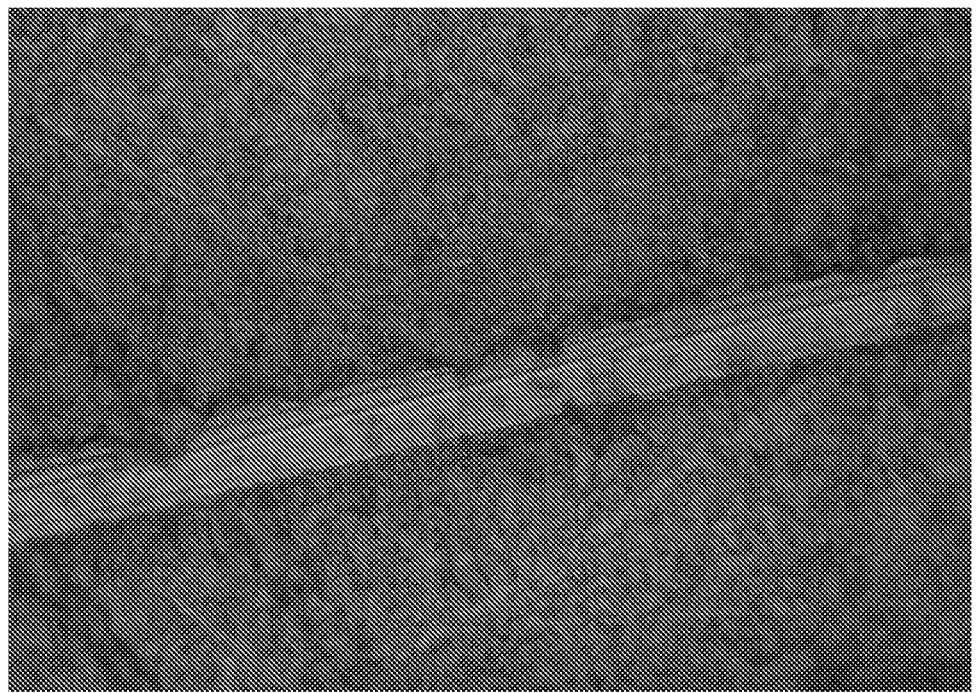
FIG. 2 shows a surface when uniform coating is being produced using the composition for coating friction surfaces according to the present invention

FIG. 2 represents a microscopic photograph magnified by 1600×. The photograph has been taken during a ceramic coating process with the new composition. It is visible that only the deepest cut made by an abrasive particle remains uncoated at this stage, but it will get coated later in the process as well. The rest of the coating is uniform.

Figure 3:
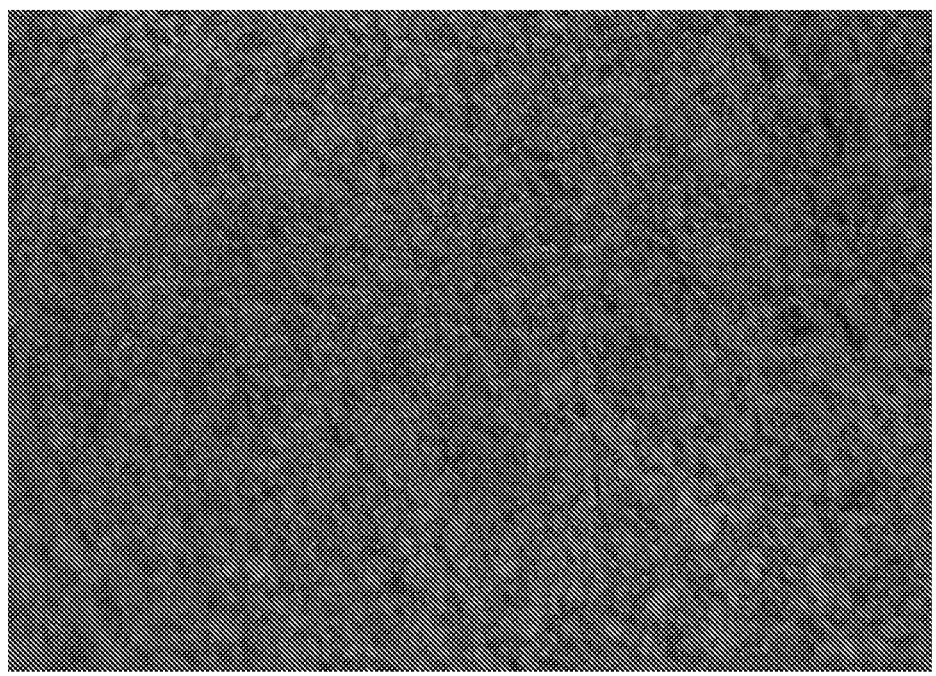
FIG. 3 shows a uniformly coated surface produced using the composition for coating friction surfaces according to the present invention.

FIG. 3 represents a microscopic photograph magnified by 1600×. The surface is fully coated with a smooth layer of ceramic of the new composition.

By changing the components introduced in the composition, it is possible to change the amount of the bound water. Thus, the temperature of the process can be adapted. If all the component parts are heat unprocessed hydrates, the process will take place at lower temperatures and will provide the formation of a more pliable and porous ceramic layer. The inventors have surprisingly found that the composition having exact relative amount of oxides of silica, aluminum, magnesium, iron, calcium and titanium supplemented with Al(OH)$_3$ as defined here enhances adaptation of the temperature.

In addition to oxides and aluminum hydroxide the composition contains residues of water. Based on the total weight of oxides the amount of water is ≤5 wt-%. Thus the amount of water based on the total weight of oxides is 0.0 to 5 wt %, typically 3 to 5 wt-% or 3 to 4.5 wt-%.

If soft materials such as untempered Fe alloys and alloys of non-ferrous metals are to be coated with ceramics, the particles of the dehydrated composition will merely cause abrasive wear of a part when pressed on the surface of a part. Consequently, it will not provide formation of a ceramic layer. In order to provide it, the heat should be emitted as a result of deformation, in such a micro amount as to exude the bound water out of the composition, thus disengaging the bonds. According to one embodiment of the present invention this problem is solved by providing a composition for coating friction surfaces comprising aluminum hydroxide in form of montmorillonite. Hydration water of montmorillonite is released due to mechanical activation and degenerated heat activates the ceramic synthesis. Alternatively or in addition gibbsite (Al(OH)$_3$) is introduced in the composition in order to decrease the temperatures even more. Consequently, it exudes water in a great amount, thus considerably lowering the temperature of the formation of the ceramic layer. Al$_2$O$_3$, which remains after the exudation of water, increases the hardness of the ceramic layer.

In one embodiment a share of Al(OH)$_3$ is provided as montmorillonite [(Na,Ca)$_{0.33}$(Al,Mg)$_2$(Si$_4$O$_{10}$)(OH)$_2$.nH$_2$O]. In various embodiments of the invention a share of Al(OH)$_3$ provided as montmorillonite is 20 wt-%, 40 wt-%, 60 wt-%, 80 wt-%, 95 wt-% or 100 wt-% of Al(OH)$_3$. Montmorillonite and/or gibbsite enhance(s) even distribution of the minerals in the composition. Al$_2$O$_3$ also provides even and durable and resilient ceramic layer. Al$_2$O$_3$ is also easily rubbed on the surfaces of the friction pair. In another embodiment a share of Al(OH)$_3$ is provided as gibbsite. In still another embodiment a share of Al(OH)$_3$ is provided as a mixture or montmorillonite and gibbsite and optionally synthetic Al(OH)$_3$. The composition, especially when formed from natural minerals, comprises also some insignificant residual constituents. Said residues are derived from e.g. serpentine, talc, and clinochlore minerals.

In one embodiment the composition for coating friction surfaces comprises a mixture of oxides comprising

| | |
|---|---|
| SiO$_2$ | 46-54 wt-% and |
| MgO | 22-26 wt-% and |
| Al$_2$O$_3$ | 12-15 wt-% and |
| Fe$_2$O$_3$ | 1.0-1.5 wt-% and |
| CaO | 0.1-0.3 wt-% and |
| TiO$_2$ | 0.18-0.21 wt-% and |
| H$_2$O | ≤5% | wherein the percentages are based on the total weight of oxides; and

| Al(OH)₃ | 3-8 wt-%, |
|---------|-----------| wherein the percentage of Al(OH)₃ is based on the total weight of the composition. CaO and/or TiO₂ enhance the formation of ceramic surface by catalyzing the reaction.

The temperature at the contact area of the contact surface of a part to be coated and the constituents of the composition should be such as to cause the joining of the crystal lattices both of a part and the constituents of the composition. The interchange of Fe⇔Mg, or any other elements take place, depending on metal alloys. Mechanical deformation and/or crushing of the particles (minerals) in the composition generate heat energy needed in the process of forming a ceramic layer.

This is a harmonized process, where the properties of both the elements—the composition and the part to be coated—should be taken into account. A large dispersion in the constituents of the composition is to be excluded in order to obtain the required precision in the process, which mostly depends on the composition and pressure. The composition has preferably a uniform particle size. Uniform distribution of the constituents in the whole composition and constant relative amounts of the constituents should remain constant expedite the properties of the ceramic surface to be formed. Thus, as the composition of natural raw materials differs even within the boundaries of one and the same mine, each batch of raw materials should be tested separately and the proportions of constituents are to be calculated according to the results of the tests. Synthetic materials do not encounter this problem; therefore according to one embodiment at least a share of synthetic constituents are used in composition for coating friction surfaces. In said embodiment a share of synthetic oxides is at least 20 wt-%, at least 40 wt-%, at least 60 wt-%, at least 80 wt-%, at least 95 wt-% or 100 wt-% synthetic oxides based on total amount of oxides. In this connection a share of synthetic aluminium hydroxide is at least 20 wt-%, at least 40 wt-%, at least 60 wt-%, at least 80 wt-%, at least 95 wt-% or 100 wt-% synthetic oxides based on total amount of the composition. In another embodiment the constituents originate from natural minerals such as serpentine, talc, clinochlore, magnesite, quartz and mixtures thereof. Natural minerals are, however, a cost effective source of constituents.

The present invention is also directed to preparations comprising a composition as described here and conventional carriers, including, but not limited to soap, oil, grease and other lubricants. The carrier is to be selected to comply with the mechanism where the surface to be coated is.

The process for preparing the composition for coating friction surfaces comprises the steps of providing a mixture of oxides comprising

| SiO₂ | 46-54 wt-% and |
|------|----------------|
| MgO | 22-26 wt-% and |
| Al₂O₃ | 12-15 wt-% and |
| Fe₂O₃ | 1.0-1.5 wt-% and |
| CaO | 0.0-0.3 wt-% and |
| TiO₂ | 0.0-0.21 wt-% and |
| H₂O | ≤5% | wherein the percentages are based on the total weight of oxides; and adding Al(OH)₃ to said mixture to obtain a composition wherein the percentage of Al(OH)₃ based on the total weight of the resulting composition is 3-8 wt-% of; and mixing said mixture of oxides with said Al(OH)₃. In one embodiment the resulting composition is sieved to obtain a particle size and distribution suitable for the desired application. Montmorillonite and/or gibbsite can be obtained, purified (when necessary) and grinded using known methods.

Further the invention is directed to use of composition described here for coating of friction surfaces and a method for coating of friction surfaces. In said method a composition for coating friction surfaces or a preparation described here is formed; and contacted with surfaces to be coated. The formation of ceramic layer is activated mechanically; e.g. by pressing said surfaces reciprocally, causing sliding and/or rolling friction between the surfaces.

The composition, the method and the use are suitable for use in all metallic friction surfaces. The ceramic coating according to the present invention will reduce friction and abrasion of the surfaces. The ceramic coating will prolong the life-time of the components and thereby provide savings in energy consumption. In addition abraded friction surfaces compromise the function of the device and application of the present composition will improve usability of the devices.

The invention claimed is:

1. A composition for coating friction surfaces comprising a mixture of oxides comprising:

| SiO₂ | 46-54 wt-%; |
|------|-------------|
| MgO | 22-26 wt-%; |
| Al₂O₃ | 12-15 wt-%; |
| Fe₂O₃ | 1.0-1.5 wt-%; |
| CaO | 0.0-0.3 wt-%; |
| TiO₂ | 0.0-0.21 wt-%; |
| H₂O | ≤5% | wherein the percentages are based on the total weight of oxides; and

| Al(OH)₃ | 3-8 wt-%, |
|---------|-----------| wherein the percentage of Al(OH)₃ is based on the total weight of the composition, and wherein a share of said Al(OH)₃ is provided as montmorillonite or as a mixture between montmorillonite and gibbsite.

2. The composition according to claim 1, wherein at least a share of said oxides is synthetic.

3. The composition according to claim 1, wherein at least a share of said Al(OH)₃ is synthetic.

4. The composition according to claim 1, wherein the composition is defined by a mixture of oxides comprising:

| SiO₂ | 46-54 wt-%; |
|------|-------------|
| MgO | 22-26 wt-%; |
| Al₂O₃ | 12-15 wt-%; |
| Fe₂O₃ | 1.0-1.5 wt-%; |
| CaO | 0.1-0.3 wt-%; |
| TiO₂ | 0.18-0.21 wt-%; |
| H₂O | ≤5% | wherein the percentages are based on the total weight of oxides; and

| | |
|---|---|
| Al(OH)$_3$ | 3-8 wt-%, | wherein the percentage of Al(OH)$_3$ is based on the total weight of the composition.

5. A preparation comprising a composition according to claim 1 and conventional carriers or additives or both.

6. A process for preparing a composition for coating friction surfaces, the process comprising steps of:
(a) providing a mixture of oxides comprising:

| | |
|---|---|
| SiO$_2$ | 46-54 wt-%; |
| MgO | 22-26 wt-%; |
| Al$_2$O$_3$ | 12-15 wt-%; |
| Fe$_2$O$_3$ | 1.0-1.5 wt-%; |
| CaO | 0.0-0.3 wt-%; |
| TiO$_2$ | 0.0-0.21 wt-%; |
| H$_2$O | ≤5% | wherein the percentages are based on the total weight of oxides; and
(b) adding Al(OH)$_3$ to said mixture to obtain a composition,
wherein the percentage of Al(OH)$_3$ based on the total weight of the composition is 3-8 wt-%; and
(c) mixing said mixture of oxides with said Al(OH)$_3$,
wherein a share of said Al(OH)$_3$ is provided as montmorillonite or as a mixture between montmorillonite and gibbsite.

7. The process according to claim 6, further comprising (d) sieving the resulting composition.

* * * * *